United States Patent [19]

Ota et al.

[11] 4,330,579
[45] May 18, 1982

[54] PARISON FOR BOTTLE PRODUCT

[75] Inventors: Akiho Ota; Yoshiaki Hayashi, both of Tokyo, Japan

[73] Assignee: Yoshino Kogyosho Co., Ltd., Tokyo, Japan

[21] Appl. No.: 278,282

[22] Filed: Jun. 29, 1981

Related U.S. Application Data

[63] Continuation of Ser. No. 109,151, Jan. 2, 1980, abandoned.

[51] Int. Cl.³ .................. B65D 1/00; B65D 85/70
[52] U.S. Cl. ...................................... 428/35; 215/1 C; 264/523; 264/DIG. 33
[58] Field of Search ............ 215/1 C; 428/35; 264/523, 531, 532, DIG. 33

[56] References Cited

U.S. PATENT DOCUMENTS 3,984,498  10/1976  McChesney .................. 264/523
4,109,813   8/1978  Valyi ............................ 215/1 C
4,149,645   4/1979  Valyi ............................ 215/1 C Primary Examiner—Herbert F. Ross

[57] ABSTRACT

A parison for producing a bottle by the biaxial orientation. The parison is prepared by injection-molding a synthetic resin into a bottomed tubular shape. The parison has its bottom portion made gradually thicker from the center of the outer circumference thereof such that the bottom portion can be uniformly oriented at a similar orientation rate to that of the drum portion of the bottle product. The bottom portion is made to protrude into such a generally semispherical shape that the radius of the outer spherical surface thereof is made larger than that of the inner spherical surface.

3 Claims, 5 Drawing Figures

PARISON FOR BOTTLE PRODUCT

This is a continuation of application Ser. No. 109,151, filed 1-2-80, now abandoned.

BACKGROUND OF THE INVENTION

1. Field of the Invention

The present invention relates to a parison for a bottle, and more particularly to a bottomed tubular parison for producing a bottle of a synthetic resin by the biaxial orientation.

2. Description of the Prior Art

A thin bottle of a synthetic resin has been produced by accomplishing the blow molding process to biaxially orient a parison which is prepared by injection molding a synthetic resin material into a bottomed tubular shape. The thin bottle thus biaxially oriented has a small weight but a high mechanical strength as well as other excellent physical properties. As a result, the thin bottle thus produced can store various liquid including a liquig having an increasing internal pressure such as carbonated beverages.

Since the parison thus prepared is to be blow-molded so that it may be biaxially oriented, it is usual that the parison has its bottom portion left so insufficiently oriented that the bottom of the thin bottle after the blow molding process is locally thickened. The bottom having a irregular thickness has less desireable mechanical strength or other physical properties.

On the other hand, in the case of the usual shape, in which the bottle bottom is flat or slightly raised at its center, it is known in the art that the oriented condition of the bottle bottom can be slightly improved if the bottom portion of the tubular parison is made in advance to protrude into a semispherical shape. According to this prior art technique, however, the bottle bottom has its center portion insufficiently oriented but its circumferential or corner portion oriented to have an excessively small thickness. Therefore, that technique is not acceptable in view of the resultant mechanical strength and other physical properties of the bottle product.

SUMMARY OF THE INVENTION

It is therefore an object of the present invention to provide a parison which can ensure the uniform thickness of the bottom of the bottle product, when it is biaxially oriented to produce the bottle, thereby to improve the mechanical strength and other physical properties of the bottle product.

Another object of the present invention is to provide a bottomed tubular parison which has its bottom portion protruding into such a semicircular shape as to make the more uniform biaxial orientation possible.

A further object of the present invention is to provide a bottom tubular parison, in which the center portion of the inner surface of the bottom portion thereof is formed into a flat shape by the injection molding process so that the thickness of the bottom wall is not markedly varied before and after the orientation even if the lug formed as the result of the pouring gate is thereafter cut away.

According to a feature of the present invention, there is provided a bottomed tubular parison for producing a bottle by the biaxial orientation, said parison being prepared by injection-molding a synthetic resin, wherein the improvement resides in that said parison has its bottom portion made gradually thicker from the center to the outer circumference thereof such that said bottom portion can be uniformly oriented at a similar orientation rate to that of the drum portion of the bottle product.

According to another feature of the present invention, there is provided a bottomed tubular parison of type having the above feature, wherein said bottom portion is made to protrude into a generally semispherical shape.

BRIEF DESCRIPTION OF THE DRAWINGS

Other objects and advantages of the present invention will become apparent from the following description made with reference to the accompanying drawings, in which.

DESCRIPTION OF THE PREFERRED EMBODIMENT

Figure 1:
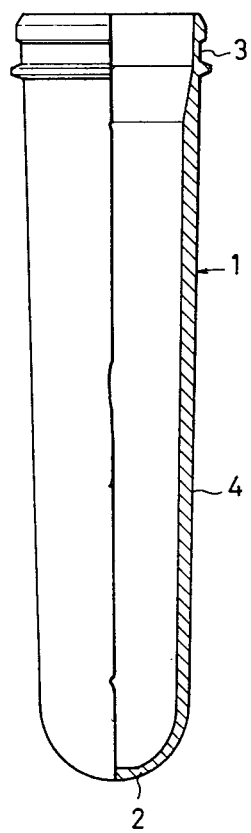
FIG. 1 is a partially broken front elevation showing a bottomed tubular parison for producing a bottle by the biaxial orientation according to the present invention.
Figure 2:
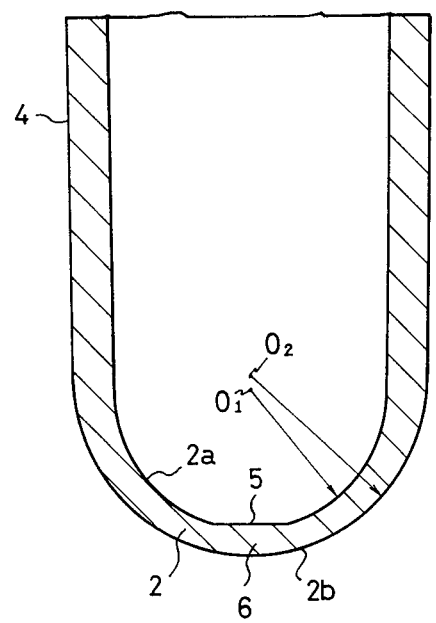
FIG. 2 is an enlarged longitudinal section showing an essential or bottom portion of the parison of FIG. 1.
Figure 3:
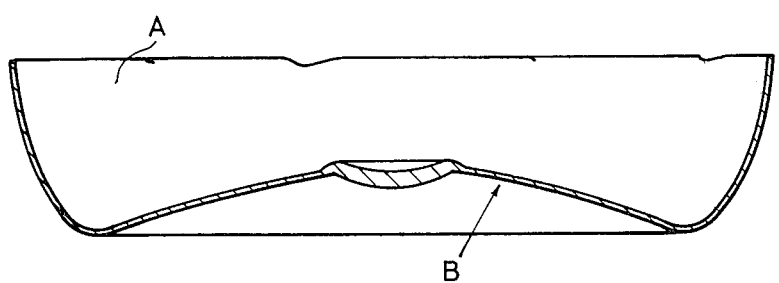
FIG. 3 is a further enlarged longitudinal section showing an essential or bottom portion of the bottle which is produced by blow-molding and biaxially orienting the parison.

A parison for producing a bottle by the biaxial orientation according to the present invention will be described with reference to FIGS. 1 to 3.

The parison, as indicated generally at reference numeral 1, is prepared by subjecting synthetic resin to the injection molding process so that the resin may be molded into a tubular shape having a bottom portion 2. The most proper synthetic resin for this purpose is a saturated polyester resin, but a resin such as polypropyrene or vinyl chloride can also be employed. The parison 1 has its upper portion formed into a mouth portion 3 which takes its final shape because it is not subjected to biaxial orientation as is the lower drum portion 4.

The bottom portion 2 of the parison 1 is made to protrude from the drum portion 4 into a semispherical shape. It should be noted here that the semispherical bottom portion 2 is made such that the radius of the outer spherical surface is larger than that of the inner spherical surface. For this purpose, more specifically, the center of radius of curvature $O_1$ of the inner spherical surface 2a is positioned below the center of radius of curvature $O_2$ of the outer spherical surface 2b so that the thickness of the bottom portion 2 is made gradually larger from the center to the outer circumference thereof.

Incidentally, the center portion 5 of the inner surface of the bottom portion 2 is formed into a flat shape within a limited small area. This is to prevent the thickness of the center portion 5 from being markedly varied and its strength from being reduced even if the lug formed by the pouring gate of the injection molding machine is cut away after the parison 1 is injection-molded assuming, of course, that that particular gate is disposed on the center portion of the outer surface of the bottom portion 2.

When the parison 1 thus prepared has its portion other than the mouth portion 3 subjected to the blow molding process of the biaxial orientation type, the biaxial orientation is first effected in the center 6 of the bottom portion 2 and is then gradually propagated to the thicker outer circumference.

As a result, even the bottom portion, which has failed to be sufficiently oriented according to the prior art, can be sufficiently oriented at a similar orientation rate to that of the drum portion. As shown in FIG. 3, therefore, the bottom B of the bottle product A can be uniformly oriented as a whole without being locally excessively thinned so that are its mechanical strength or other physical properties improved.

Figure 4:
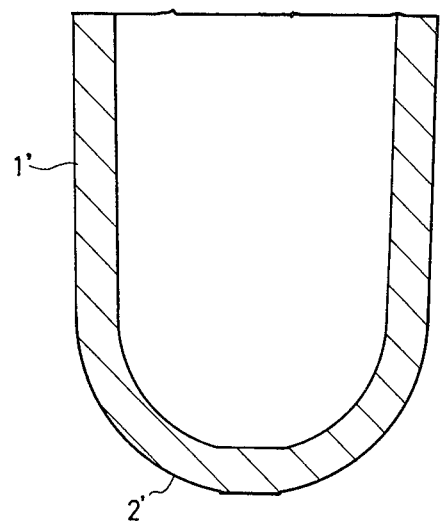
FIG. 4 is similar to FIG. 2 but shows a parison prepared according to the prior art.
Figure 5:
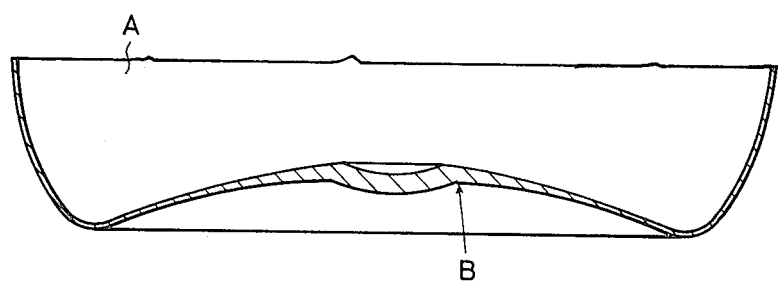
FIG. 5 is similar to FIG. 3 but shows the bottle which is produced from the parison of FIG. 4.

On the contrary, in case the bottom portion 2′ of a parison 1′ has not its thickness locally varied but has a uniform thickness, as shown in FIG. 4, the desired uniform orientation cannot be attained. The oriented condition established according to the prior art is, as shown in FIG. 5, such that the center portion of the bottom B of the bottle product A is insufficiently oriented whereas the circumferential or corner portion is oriented to have excessively small thickness.

As has been described hereinbefore, according to the present invention, since the thickness of the bottom portion of the parison is made gradually larger from the center to the outer circumference thereof, the biaxial orientation is started at the center of the bottom portion and is propagated to the outer circumference. As a result, the bottom portion can be sufficiently biaxially oriented thereby to have a uniform thickness so that it can have its mechanical strength and other physical properties improved.

Moreover, since the bottom portion of the parison is made to protrude into the semispherical shape, its orientation can be brought into more uniform condition than the prior art. Still moreover, since the center portion of the inner surface of the bottom portion of the parison is formed into the flat shape, it can be oriented without any considerable change in thickness even if the portion corresponding to the pouring gate is cut away after the injection molding process of the parison.

According to the present invention, on the other hand, no special device need not be added for sufficiently orienting the bottom portion of the parison, and the material required for the molding process of the parison can be so reduced as to reduce the production cost.

What is claimed is:

1. A bottomed tubular parison for producing a bottle by biaxial orientation, said parison prepared by injection molding a synthetic resin and comprising:
   a tubular drum portion; and
   a bottom portion; and wherein:
   said bottom portion is of generally semispherical shape and protrudes outwardly of the parison;
   a central area of the inner surface of said bottom portion is flattened, the thickness of the flattened portion of the bottom portion having a first thickness at the center thereof and gradually decreasing toward the outer periphery;
   the remainder of said bottom portion has a thickness which increases gradually in the direction away from said central area from a second thickness adjacent said central area to a third thickness as it joins smoothly with the side walls of said tubular drum portion, said second thickness being of smaller dimension than said first thickness, such that said bottom portion will have a uniform thickness after biaxial orientation thereof.

2. A bottomed tubular parison as set forth in claim 1, wherein, except for said flattened inner surface portion, the radius of curvature of the outer spherical surface of said bottom portion is made larger than that of the inner spherical surface.

3. A bottomed tubular parison as set forth in claim 2, wherein the center of radius of curvature of said inner spherical surface is positioned below that of the outer spherical surface.

* * * * *

UNITED STATES PATENT AND TRADEMARK OFFICE
CERTIFICATE OF CORRECTION

PATENT NO. : 4,330,579
DATED : May 18, 1982
INVENTOR(S) : AKIHO OTA and YOSHIAKI HAYASHI It is certified that error appears in the above-identified patent and that said Letters Patent are hereby corrected as shown below:

Title page, left column, insert

---[30] Foreign Application Priority Data

January 16, 1979 [JA] Japan Utility Model 54-4303---.

Signed and Sealed this

Twenty-fourth Day of August 1982

|SEAL|

Attest:

GERALD J. MOSSINGHOFF

Attesting Officer — Commissioner of Patents and Trademarks